(12) United States Patent  (10) Patent No.: US 8,720,320 B1
Rivera  (45) Date of Patent: May 13, 2014

(54) POD ADAPTOR SYSTEM FOR SINGLE SERVICE BEVERAGE BREWERS

(75) Inventor: Adrian Rivera, Las Vegas, NV (US)

(73) Assignee: ARM Enterprises, Inc., Santa Fe Springs, CA (US)

( * ) Notice: Subject to any disclaimer, the term of this patent is extended or adjusted under 35 U.S.C. 154(b) by 832 days.

(21) Appl. No.: 11/777,831

(22) Filed: Jul. 13, 2007

(51) Int. Cl.
*A47J 31/06* (2006.01)

(52) U.S. Cl.
USPC ............................................................ 99/295

(58) Field of Classification Search
USPC ........ 99/295, 287, 289 R, 302 R; 426/77, 78, 426/79, 80, 112, 115, 132, 394
See application file for complete search history.

(56) References Cited

U.S. PATENT DOCUMENTS

| | | | |
|---|---|---|---|
| 2,433,815 A | | 12/1947 | Laforge |
| 3,115,822 A | * | 12/1963 | Totten .......................... 99/289 R |
| 3,120,170 A | * | 2/1964 | Garte ............................... 99/287 |
| 3,136,241 A | * | 6/1964 | Price ............................ 99/302 R |
| 3,199,682 A | * | 8/1965 | Scholtz ........................... 210/479 |
| 3,384,004 A | | 5/1968 | Perlman et al. |
| 3,583,308 A | * | 6/1971 | Williams ..................... 99/302 R |
| 3,607,297 A | * | 9/1971 | Fasano ............................ 426/433 |
| 3,844,206 A | * | 10/1974 | Weber .............................. 99/282 |
| 4,253,385 A | * | 3/1981 | Illy ................................. 99/281 |
| 4,286,515 A | | 9/1981 | Baumann et al. |
| 5,123,335 A | | 6/1992 | Aselu |
| 5,233,914 A | | 8/1993 | English |
| 5,325,765 A | | 7/1994 | Sylvan et al. |
| 5,335,589 A | * | 8/1994 | Yerves et al. .................... 99/295 |
| 5,526,733 A | | 6/1996 | Klawuhn et al. |
| 5,582,730 A | * | 12/1996 | Hugentobler .................. 210/474 |
| 5,676,041 A | * | 10/1997 | Glucksman et al. ............. 99/286 |
| 5,829,340 A | | 11/1998 | Yang |
| 5,840,189 A | | 11/1998 | Sylvan et al. |
| 5,870,943 A | | 2/1999 | Levi et al. |
| 6,136,352 A | * | 10/2000 | Silverstein et al. ........... 426/115 |
| D454,433 S | | 3/2002 | Peter |
| D454,434 S | | 3/2002 | McDaniel et al. |
| 6,440,256 B1 | | 8/2002 | Gordon et al. |
| D474,110 S | | 5/2003 | Sweeney |
| D474,111 S | | 5/2003 | Lazaris |
| 6,589,577 B2 | | 7/2003 | Lazaris et al. |

(Continued)

FOREIGN PATENT DOCUMENTS

WO WO 2005/092160 * 10/2005 .............. A47J 31/06

*Primary Examiner* — Yuwen Pan
*Assistant Examiner* — Mark Woodall
(74) *Attorney, Agent, or Firm* — IP Strategies

(57) ABSTRACT

A pod adaptor assembly for use in combination with a single serve beverage brewer is provided. The assembly is especially designed for brewing pods in brewers configured for cup-shaped beverage extract cartridges. The assembly includes a receptacle and a cover configured to sealingly engage with the receptacle. The receptacle has a base with a raised portion which is adapted to provide a support surface for a pod. The base of the receptacle also provides an opening adapted to receive an upwardly extending puncture needle from the brewer in a manner such that the needle extends through the base and does not puncture the pod. The cover also has an opening that is adapted to receive a downwardly extending liquid injector probe from the brewer. In some implementations, spaced apart protrusions are arranged on the pod support surface thereby creating gaps to facilitate flow of brewed beverage. In other implementations, the assembly also includes a spring bias mechanism adapted to press the pod against the cover so as to create a tamping effect.

21 Claims, 9 Drawing Sheets

(56) References Cited

U.S. PATENT DOCUMENTS

| | | |
|---|---|---|
| 6,606,938 B2 | 8/2003 | Taylor |
| 6,607,762 B2 | 8/2003 | Lazaris et al. |
| 6,645,537 B2 | 11/2003 | Sweeney et al. |
| 6,655,260 B2 * | 12/2003 | Lazaris et al. ............... 99/295 |
| 6,658,989 B2 | 12/2003 | Sweeney et al. |
| 6,708,600 B2 | 3/2004 | Winkler et al. |
| 6,740,345 B2 * | 5/2004 | Cai ............................... 426/77 |
| 6,832,542 B2 * | 12/2004 | Hu et al. ..................... 99/302 R |
| 6,843,165 B2 * | 1/2005 | Stoner ............................ 99/295 |
| D502,362 S | 3/2005 | Lazaris et al. |
| 6,948,420 B2 * | 9/2005 | Kirschner et al. .............. 99/295 |
| 7,081,263 B2 | 7/2006 | Albrecht |
| 7,320,274 B2 | 1/2008 | Castellani |
| 7,946,217 B2 | 5/2011 | Favre et al. |
| 8,047,127 B2 | 11/2011 | Lin |
| 2002/0148356 A1 * | 10/2002 | Lazaris et al. ................. 99/295 |
| 2004/0118290 A1 | 6/2004 | Cai |
| 2006/0159815 A1 * | 7/2006 | Crook et al. .................. 426/394 |
| 2006/0174769 A1 * | 8/2006 | Favre et al. ..................... 99/275 |
| 2006/0196364 A1 * | 9/2006 | Kirschner ....................... 99/295 |
| 2009/0229471 A1 | 9/2009 | Lun et al. |
| 2010/0083843 A1 | 4/2010 | Denisart et al. |

* cited by examiner

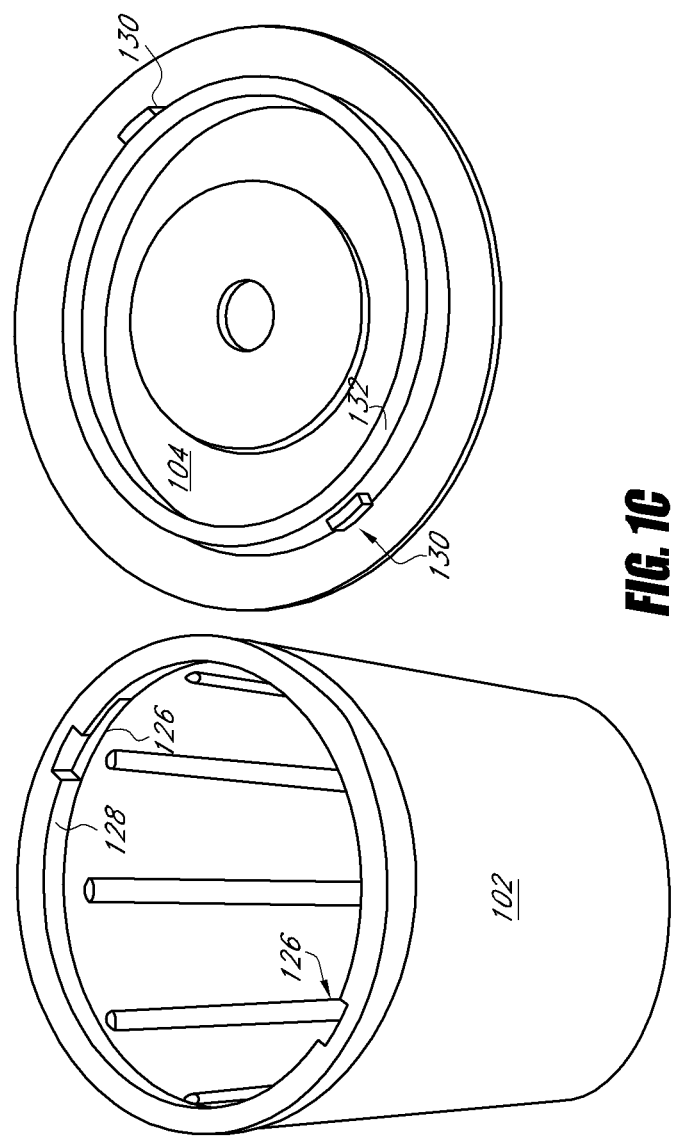

POD ADAPTOR SYSTEM FOR SINGLE SERVICE BEVERAGE BREWERS

BACKGROUND OF THE INVENTION

1. Field of the Invention

This invention generally relates to accessories for single serve beverage brewers, and more particularly, relates to an adaptor assembly configured to effect operative compatibility between a single serve beverage brewer and beverage pods.

2. Description of the Related Art

Various types of single serve beverage brewers have been developed in recent years. These machines are generally designed with brewing chambers adapted to receive a small packet of ground coffee or other beverage extract. Once the beverage packet is placed in the brewing chamber, the machine injects hot water into the packet to produce a single serving of freshly brewed beverage. Some machines have brewing chambers configured to receive pods which are small, flattened disk-shaped filter packages of beverage extract, while other machines are configured to accommodate larger, cup-shaped beverage filter cartridges.

One particular type of single serve beverage brewers designed to accommodate the cup-shaped beverage filter cartridge is manufactured and sold by Keurig Inc. of Wakefield, Mass. The machine has a brewing chamber dimensioned to receive cup-shaped cartridges such as those sold under the trademark K-Cup. These cartridges are configured in the form of a container having a cone-shaped permeable filter packet containing a dry beverage medium such as ground coffee, which is disposed in the interior of the container. The machine also has upper and lower puncture needles. In operation, the upper needle punctures the top cover of the cartridge and injects pressurized water through the opening onto the beverage medium while the lower needle punctures the bottom of the cartridge to create an outlet for outflow of the brewed beverage. Additional detailed descriptions of this type of machine and cartridge are disclosed in U.S. Pat. Nos. 5,325,765, 5,840,189 and 6,606,938, which are incorporated herein by reference.

The configuration of the brewing chamber of the above described single serve beverage brewer inherently limits the use of the machine to cup-shaped cartridges. As a result, users of the Keurig machine or similar brewers designed for cup-shaped cartridges would have to purchase a different machine to brew beverage from pods, which are typically somewhat flattened disc shaped filter paper packets containing coffee. The use of multiple machines can be costly, inconvenient and cause inefficient use of counter space. Thus, there is a need for an apparatus and method for modifying single serve beverage brewers configured for cup-shaped cartridges so that they can also be used to brew beverages from pods.

Additionally, conventional automated pod brewers typically include a brewing chamber adapted to receive an individual pod. During the brewing process, hot water is injected into the brewing chamber across the surface of the pod while brewed beverage is directed to flow out of an outlet into a cup. Some coffee connoisseurs believe that coffee brewed using pod brewers do not have as good flavor extraction as coffee brewed by baristas who usually tamp or compact the coffee prior to brewing. Thus, there is a need for an improved pod brewing system.

The preferred embodiments of the present invention are developed to ameliorate at least one of the above-mentioned shortcomings related to beverage brewing systems.

SUMMARY OF THE INVENTION

As used herein, the term "pod" is a broad term and shall have its ordinary meaning and shall include, but not be limited to, a package formed of a water permeable material and containing an amount of ground coffee or other beverage therein.

The preferred embodiments of the present invention have several features, no single one of which is solely responsible for their desirable attributes. Without limiting the scope of this invention, its more prominent features will now be discussed briefly. However, not all of the following features are necessary to achieve the advantages of the device. Therefore, none of the following features should be viewed as limiting. After considering this discussion, and particularly after reading the section entitled "Detailed Description of the Preferred Embodiments," one will understand how the features of the preferred embodiments provide advantages over prior art devices.

In one embodiment, the present invention provides a pod adaptor assembly for use in combination with a single serve beverage brewer designed with upper and lower puncturing devices for piercing cup-shaped cartridges. The pod adaptor assembly comprises a receptacle and a cover adapted to sealingly engage with the receptacle. The receptacle preferably comprises a base having an interior surface and an exterior surface. A raised portion is formed on the interior surface of the base, wherein the raised portion is adapted to provide a support surface for a pod. Preferably, the base of the receptacle is also adapted to receive an upwardly extending puncture needle from the brewer in a manner such that the needle extends through the base and does not puncture the pod. In one implementation, the receptacle further comprises protrusions formed on the interior surface of the base. In another implementation, the protrusions comprise ribs arranged in a spaced apart manner across the interior surface. In certain preferred implementations, the assembly further comprises a biasing mechanism adapted to press the pod against the cover when the cover is sealingly engaged with the receptacle, thereby compacting the beverage extract and creating a tamping effect.

In another embodiment, the present invention provides a pod adaptor assembly which comprises a housing having an interior region adapted to receive a beverage pod. The housing further includes a raised support disposed in the interior region and adapted for supporting a pod. Preferably, the raised support is spring biased. The assembly further includes a lid adapted to sealingly engage with the housing. In one implementation, the interior region of the housing further comprises a passageway adapted for receiving a puncture needle extending upwardly through the lower exterior surface. In another implementation, the raised support surface is spring biased.

In yet another embodiment, the present invention provides a pod adaptor assembly comprising a receptacle having a spring biased support surface for a pod and a cover adapted to sealingly engage with the receptacle. In one implementation, the assembly further includes an inlet port adapted for introducing pressurized hot water into the receptacle and an outlet port adapted for permitting brewed beverage to flow out of the receptacle. In certain preferred implementations, the inlet port comprises an opening formed in the cover and the outlet port comprises an opening formed in the receptacle.

In yet another embodiment, the present invention provides brewing chamber for a beverage pod. The chamber comprises a housing adapted to receive the beverage pod, wherein the housing has a base and a plurality of sidewalls extending upwardly from the base. The chamber further comprises a cover adapted to sealingly engage with the housing and a biasing device, wherein the biasing device is adapted to press the beverage pod against at least a portion of the cover when the cover is sealingly engaged with the housing. In one implementation, the brewing chamber further comprises an inlet port, wherein the inlet port is adapted to introduce hot water into the housing. In another implementation, the biasing device comprises a spring. Preferably, the biasing device is adapted to accommodate and exert pressure against pods of different configurations and sizes. The biasing device also preferably applies a pressure against the beverage pod in a manner such that the pressure compacts the beverage extract inside the pod.

BRIEF DESCRIPTION OF THE DRAWINGS

FIG. 1C is a schematic illustration of a receptacle of yet another embodiment of the pod adaptor assembly of FIG. 1A, illustrating a locking mechanism for securing the cover over the receptacle;

DETAILED DESCRIPTION OF THE PREFERRED EMBODIMENT

The pod adaptor assembly of one preferred embodiment of the present invention is designed to be used in combination with a single serve beverage brewer having a brewing chamber configured to receive a cup-shaped filter cartridge such as those sold under the trademark K-Cup. Additional descriptions of certain embodiments of the brewer are disclosed in U.S. Pat. Nos. 6,708,600 and 7,165,488, which are hereby incorporated by reference in their entireties.

Figure 1A:
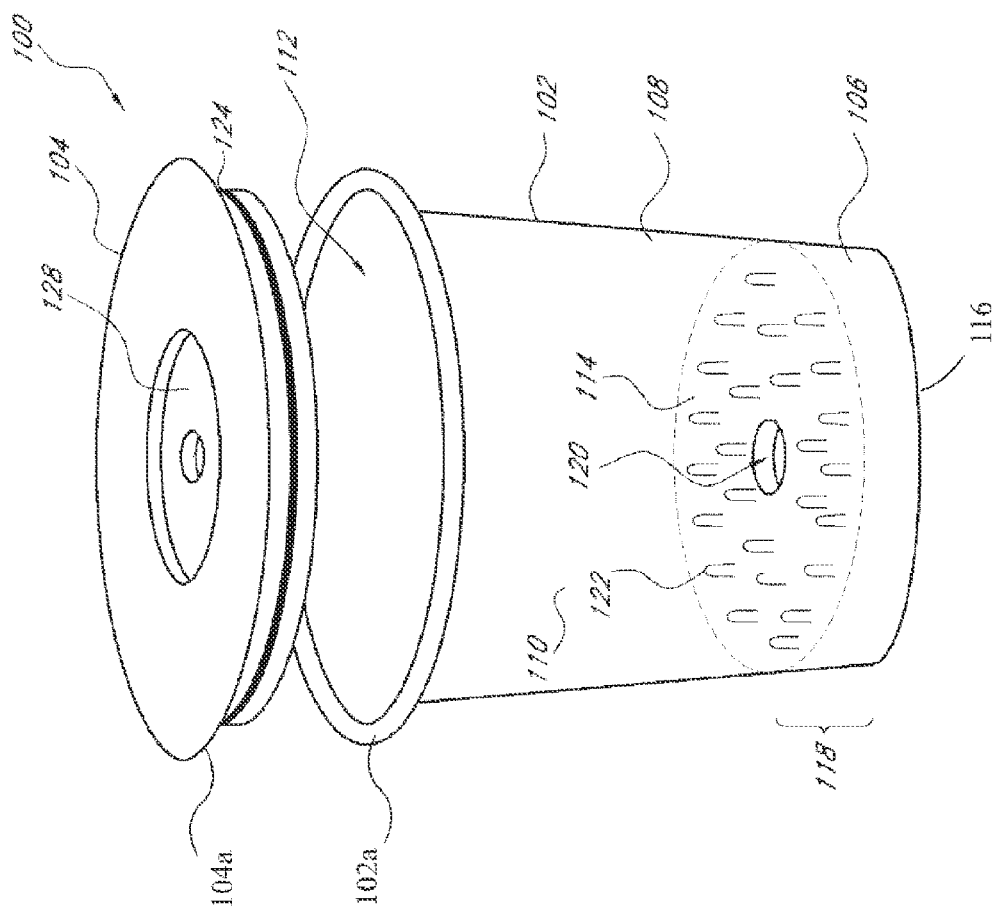
FIG. 1A is a schematic illustration of a pod adaptor assembly of one preferred embodiment of the present invention.
Figure 1:
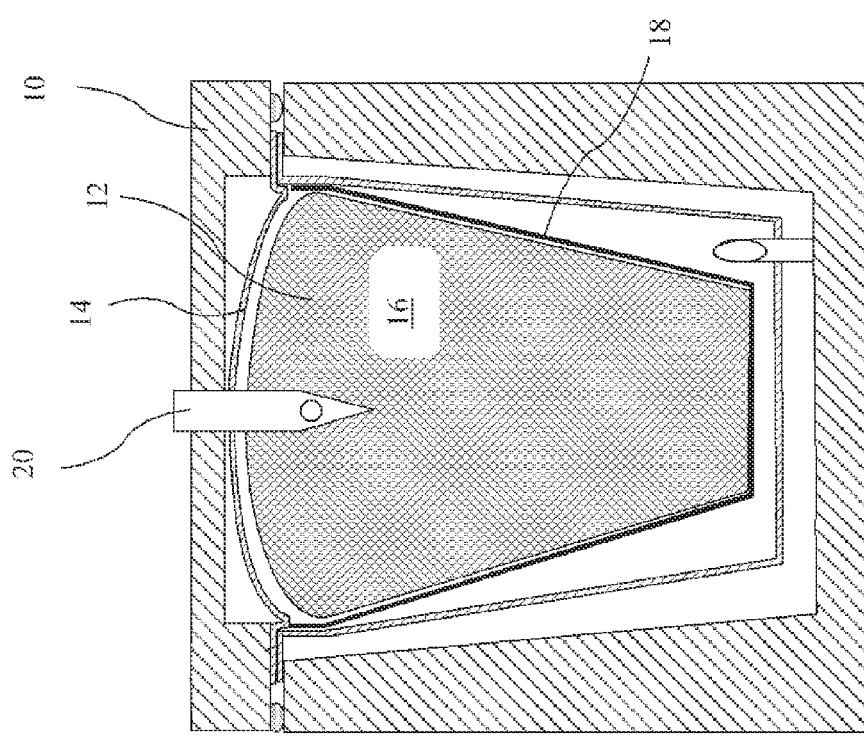
FIG. 1 shows a prior art brewing cartridge residing in a portion of a prior art coffee maker.

FIG. 1 shows a prior art brewing cartridge 12 residing in a brewing chamber 10 of a prior art cartridge style single serving coffee maker as disclosed in U.S. Pat. Nos. 5,325,765 and 5,840,189, incorporated by reference above. The brewing cartridge 12 includes a pierceable shell 14 and contains brewing material 16 held in the cartridge by filter material 18. An upper needle (or liquid injector probe) 20 element of the cartridge style single serving coffee maker penetrates the top of the shell 14 and an offset bottom needle 22 element of the cartridge style coffee maker penetrates the shell 14. The upper needle 20 is seen to enter the brewing cartridge 12 by piercing the shell 14 and contact the brewing material 16. The lower needle 22 pierces the shell 14 but avoids the filter material. 18 and brewing material 16.

FIG. 1A illustrates a pod adaptor assembly 100 of one embodiment of the present invention. As shown in FIG. 1A, the pod adaptor assembly 100 generally comprises a cup-shaped receptacle 102 and a cover 104 adapted to sealingly engage with the receptacle 102. The receptacle 102 has a substantially circular base 106 and sidewalls 108 extending upwardly from the base 106 to define a housing 110 having an upper opening 112. The base 106 has an interior surface 114 and an exterior surface 116, which are separated by a distance 118 so that the interior surface 114 is elevated above the exterior surface by the distance. In one embodiment, the distance 118 is between 1 and 20 mm. In another embodiment, the distance is about 10 mm. While the preferred embodiments of the pod assembly utilize a cup-shaped receptacle, the receptacle can assume other shapes and configurations such as square or cylindrical without departing from the spirit of the present invention.

As also shown in FIG. 1A, a passageway 120 is formed in the base 106 of the receptacle 102, extending between the interior and exterior surfaces 114, 116 of the base 106. The passageway 120 is configured to receive a needle-like structure that is typically mounted in the single serve beverage brewer to puncture the bottom of a disposable cup-shaped filter. The location of the passageway 120 relative to the base 106 is preferably selected to match the relative location of the needle-like structure in the brewer. In a preferred embodiment, the passageway 120 is slightly off-center from the base to correspond to the location of the needle. In operation, the needle-like structure is designed to move upwardly toward the bottom of the base 104 of the receptacle a first distance so as to puncture the bottom of the cup-shaped filter. To prevent the needle-like structure from hitting against the base of the receptacle or piercing the beverage pod inside the receptacle, the passageway 120 allows the needle-like structure to move freely without jamming against the receptacle or the pod. The passageway 120 also serves the purpose of providing an outlet for brewed beverage to flow out of the receptacle into a drinking vessel. In one embodiment, the passageway 120 is substantially circular and has a diameter of the about 5 mm and a length of about 10 mm.

Figure 1B:
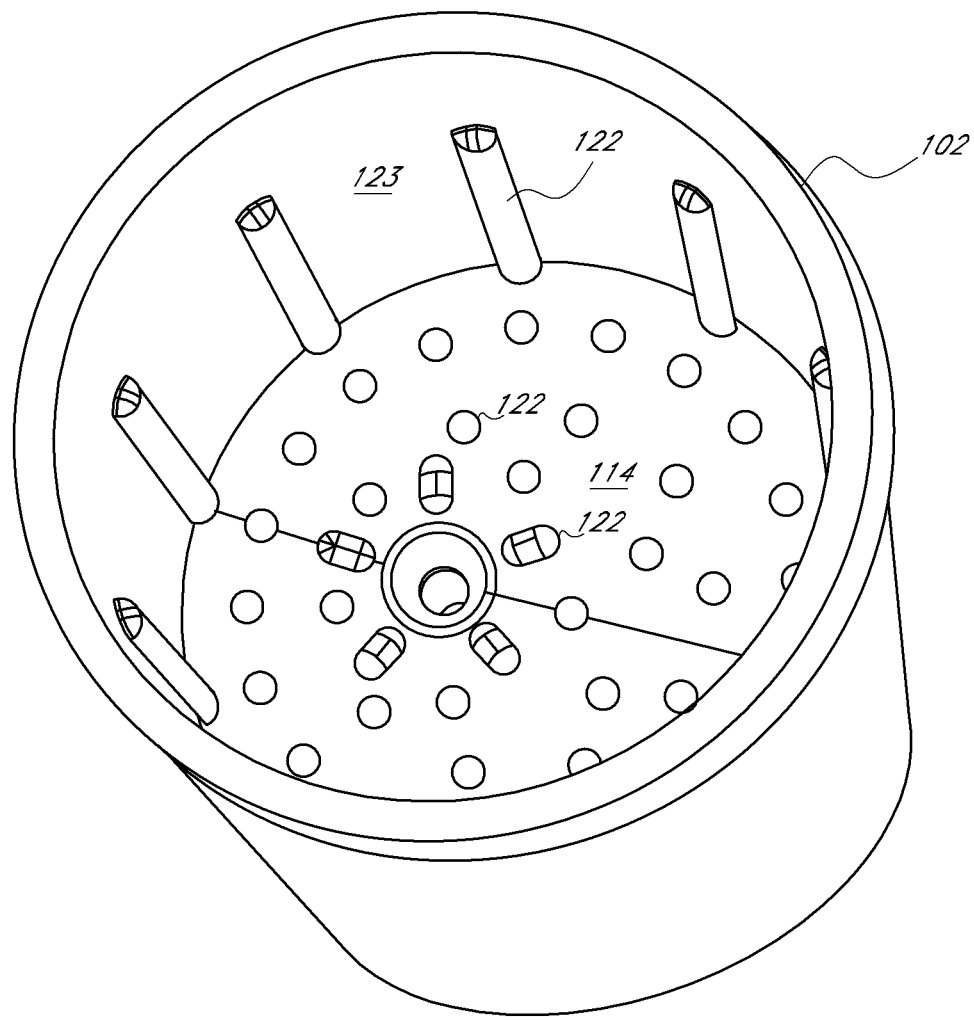
FIG. 1B is a schematic illustration of a receptacle of one embodiment for the pod adaptor assembly of FIG. 1A.

As FIG. 1A further shows, a plurality of angularly spaced apart protrusions 122 are formed across the interior surface 114 of the base. The protrusions 122 collectively provide a plurality of spaced apart raised surfaces for the pod to rest against. When the pod is placed inside the receptacle and resting against the protrusions, the gaps between the pod the interior surface 114 of the base allow brewed beverage to flow unobstructed from the pod down through the passageway 120. In one implementation, the protrusions can be configured in the manner shown in FIG. 1B. As shown in FIG. 1B, the protrusions 122 comprise a plurality of circular and oval shaped protrusions extending upwardly from the lower surface 114 of the receptacle 102. In some implementations, a plurality of ribs 122 are also arranged to extend outwardly from an interior side surface 123 of the receptacle 102.

As also shown in FIG. 1A, the cover 104 of the assembly 100 has a circular configuration and a seal 124 sized to sealingly engage the cover 104 to the receptacle opening 112 in a manner known in the art. The cover 104 has an opening 136 configured to accommodate a liquid inlet probe from the brewer. The liquid inlet probe is typically used to pierce the cup-shaped filter cartridge and introduce pressurized hot water into the cartridge. In certain embodiments, the cover 104 also has a circular recessed section 128 disposed concentrically around the opening 136. The circular recessed section 128 is adapted to mate with a correspondingly shaped circular protrusion formed on the single serve brewer. The cover 104 includes a rim 104a resting on a top edge 102a of the receptacle 102 at the top of the sidewall 108. In some embodiments, the rim 104a extends radially beyond the top edge 102a.

In certain embodiments, the assembly 100 further includes a locking mechanism adapted to lock the cover in place relative to the receptacle. FIG. 1C illustrates one example of such locking mechanism. As shown in FIG. 1C, a plurality of notches 126 are formed in the interior rim of the receptacle. The notches 126 are configured to engage with mating protrusions 130 formed on an interior rim 132 of the cover 104. When the cover 104 is positioned over the opening of the receptacle 102, the protrusions 130 on the interior rim 132 of the cover preferably slidably engage with the notch so as to lock the cover in place. It will be appreciated that other locking mechanisms known in the art can also be used to lock the cover in place.

Figure 2:
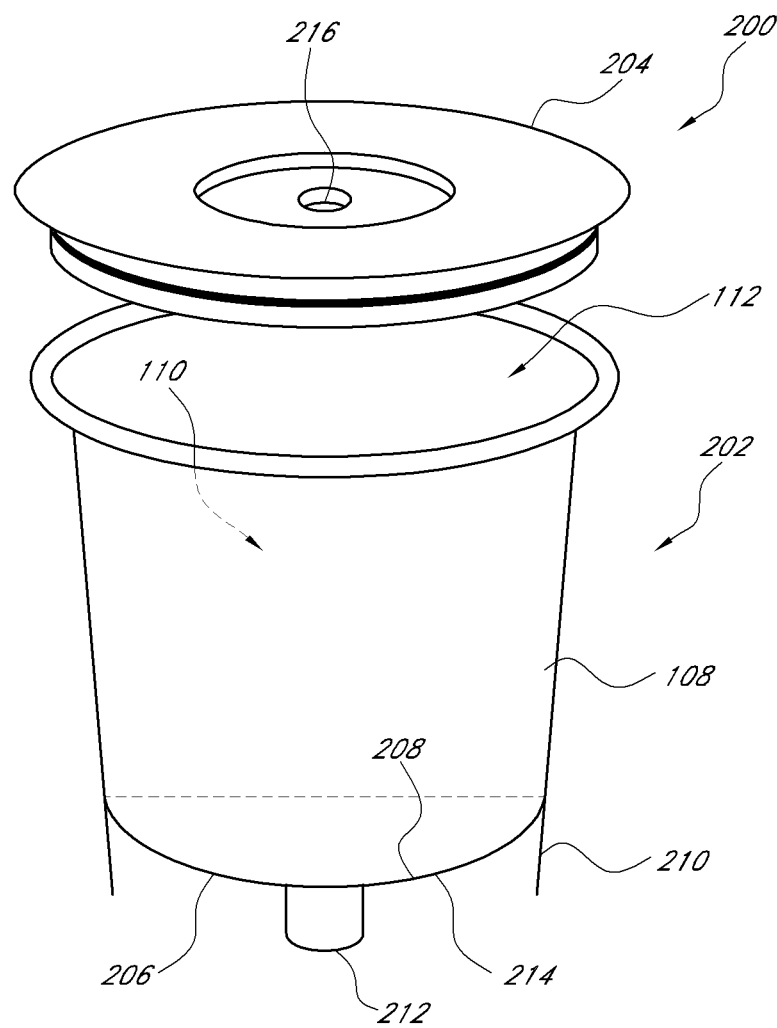
FIG. 2 is a schematic illustration of a pod adaptor assembly of another preferred embodiment of the present invention.

FIG. 2 illustrates a pod adaptor assembly 200 of another embodiment of the present invention. The pod adaptor assembly 200 generally comprises a cup-shaped receptacle 202 adapted to receive a pod and a cover 204 adapted to sealingly engage with the receptacle 202. The receptacle 202 has a base 206 having a downwardly sloping interior surface 208 supported by a plurality of legs 210. A passageway 212 extends downwardly from the exterior surface 214 of the base. The passageway 212 is adapted to guide and allow the needle-like structure from the brewer to extend upwardly without hitting against the receptacle or piercing the pod inside the receptacle. The passageway 212 also permits outflow of the brewed beverage from the receptacle. In one embodiment, the passageway 212 has a diameter of about 5 mm and a length of about 1 mm to 20 mm. The location of the passageway 212 relative to the base 206 is preferably selected to correspond to the location of the upwardly moving needle in the brewer. In one embodiment, the passageway 212 is offset by about 1-5 mm from the center of the base. As also shown in FIG. 2, the cover 204 of the assembly 200 has an opening 216 formed therethrough, which is adapted to allow insertion of a liquid inlet probe from the brewer.

Figure 3A:
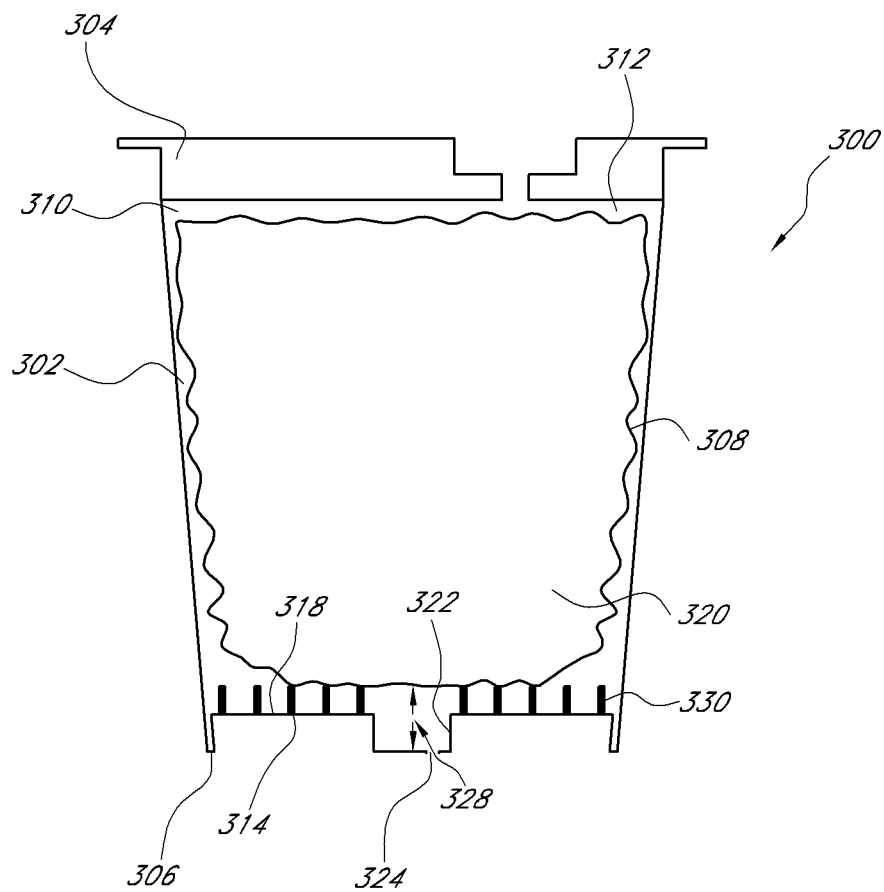
FIG. 3A is a schematic illustration of a pod adaptor assembly of yet another preferred embodiment of the present invention.

FIG. 3A is a schematic illustration of a pod adaptor assembly 300 of another preferred embodiment of the present invention. The pod adaptor assembly 300 generally comprises a receptacle 302 and a cover 304 adapted to sealingly engage with the receptacle 302. The receptacle 302 has a substantially circular base 306 and sidewalls 308 extending upwardly from the base 306 defining a housing 310 having an upper opening 312. The base 306 has an annular raised portion 314 extending upwardly from a lower surface 316 of the base and an opening 324 formed in a portion of the base that is not raised. The raised portion 314 provides a raised support surface 318 for a pod 320 so that the pod 320 does not contact and possibly block the opening 324 for brewed coffee to flow through. Preferably, the lower surface of the pod 320 is also elevated from the opening 324 by a distance 328 which is calculated to accommodate the upward extension of the puncture needle in the brewer during operation. In one embodiment, the distance 328 is between about 5 to 20 mm. In certain preferred embodiments, a plurality of spaced apart protrusions 330 are formed on the raised support surface 318, the protrusions 330 providing upward support for the pod 320. The gaps between the protrusions facilitate flow of brewed beverage from the pod toward the opening 324.

Figure 3B:
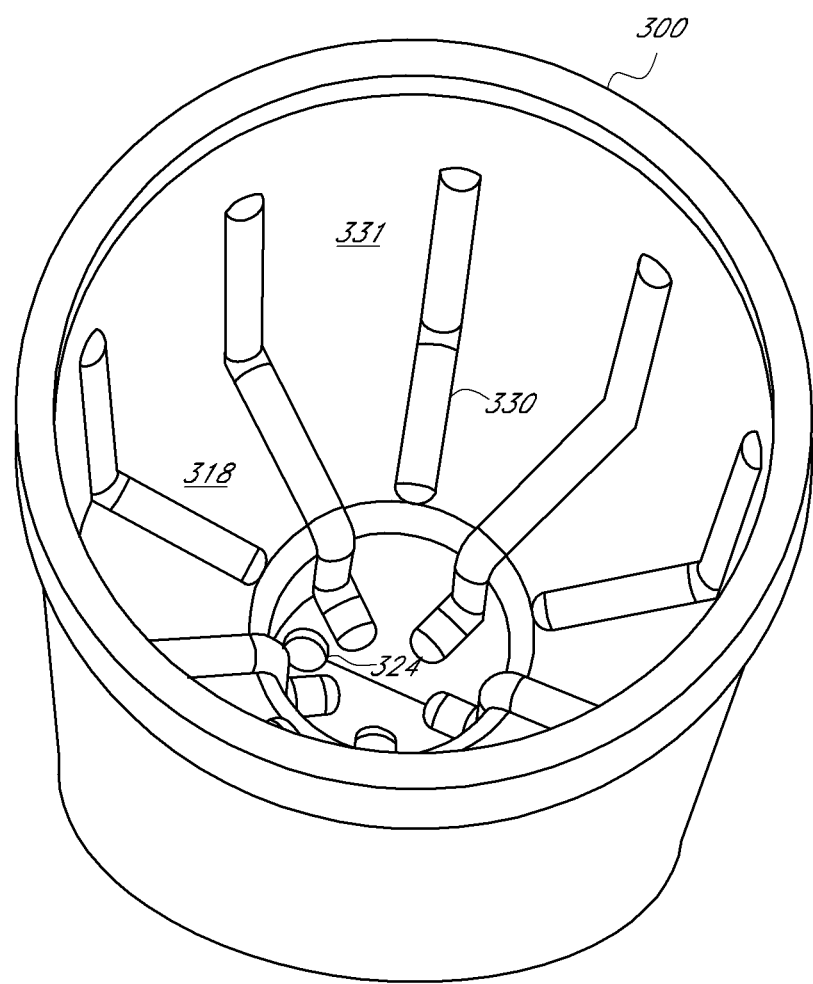
FIG. 3B is a schematic illustration of a receptacle of one embodiment for the pod adaptor assembly of FIG. 3A.

FIG. 3B illustrates radially extending protrusions 330 of one implementation for the receptacle 300 of FIG. 3A. As shown in FIG. 3B, the protrusions 330 comprise a plurality of spaced apart ribs disposed on an interior side wall 331 and both the raised and non-raised interior surface portions 318. As also shown in FIG. 3B, the opening 324 is located at an offset from the center of the base of the receptacle. The location is configured to correspond to the location of the puncture needle when the assembly is placed in the brewing chamber of the brewer.

Figure 4:
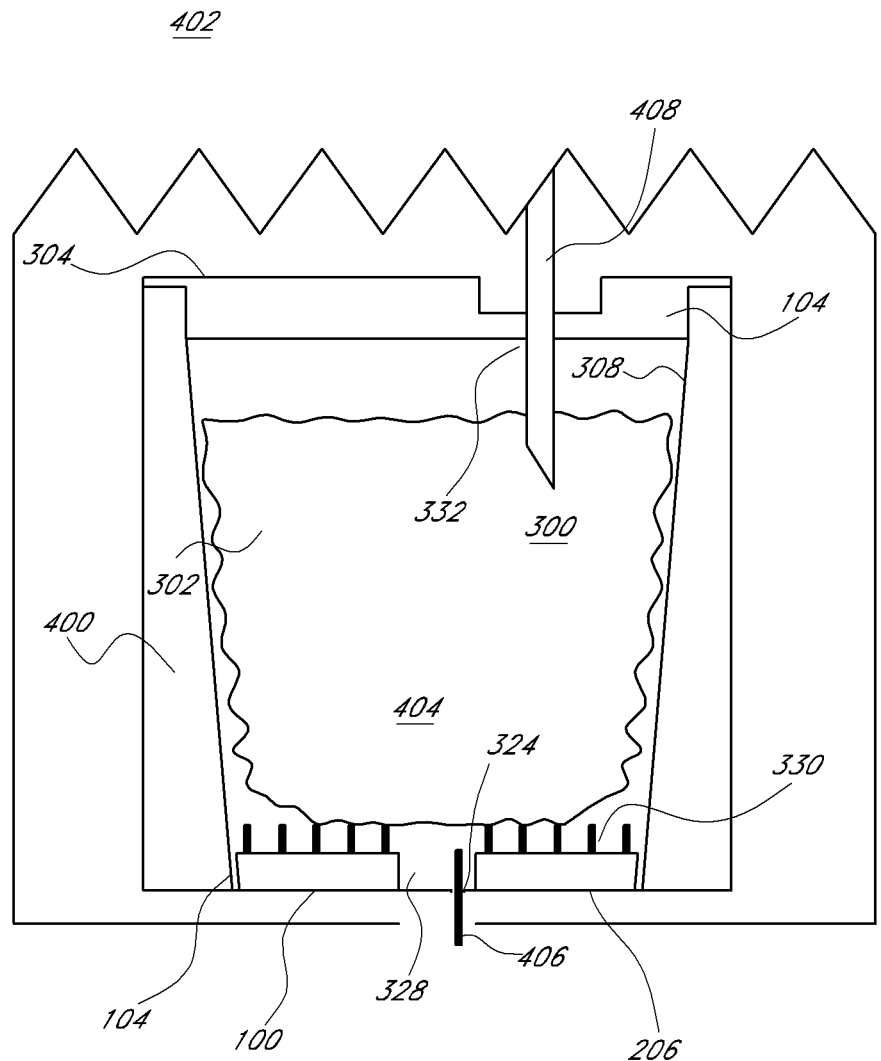
FIG. 4 is a schematic illustration of the pod adaptor assembly of FIG. 3 used in combination with a single serve beverage brewer having upper and lower puncturing devices.

FIG. 4 is a schematic illustration of the pod adaptor assembly of FIG. 3A used in conjunction with a single serve beverage brewer in brewing a beverage pod. As shown in FIG. 4, the pod adaptor assembly 300 is placed in a brewing chamber 400 of a single serve brewer 402 known in the art and configured for brewing cup-shaped filter cartridges. In one embodiment, the single serve brewer 402 is sold under the trademark Keurig. As also shown in FIG. 4, a beverage pod 404, preferably containing ground coffee, is positioned inside the receptacle 302 of the assembly 100. The pod 402 preferably fits snugly inside the receptacle 302 and rests against the protrusion 330. In operation, a lower puncture needle 406 of the brewer extends upwardly through the passageway 116 of the receptacle 102. As described above, the lower puncture needle 406 is designed to extend upwardly and puncture the bottom of a cup-shaped cartridge that is normally inside the brewing chamber. To adapt the brewer 402 for use in brewing beverage pods which do not need to be punctured, the opening 324 in the base of the receptacle allows the puncture needle 406 to extend into the receptacle and the distance 328 between the opening 324 and the pod 404 is dimensioned such that the puncture needle 406 does not contact and pierce the pod 404. The distance advantageously provides an offset that accommodates the upward movement of lower puncture needle 406 without piercing the pod or damaging the needle. As also shown in FIG. 4, a liquid inlet probe 408 is extended downwardly through an opening 332 formed in the cover 304 of the assembly 300. In some embodiments, the pod 404 is positioned such that the liquid inlet probe 408 punctures the pod 404. In other embodiments, the pod 404 is positioned such that the liquid inlet probe 408 does not puncture the pod.

Figure 5:
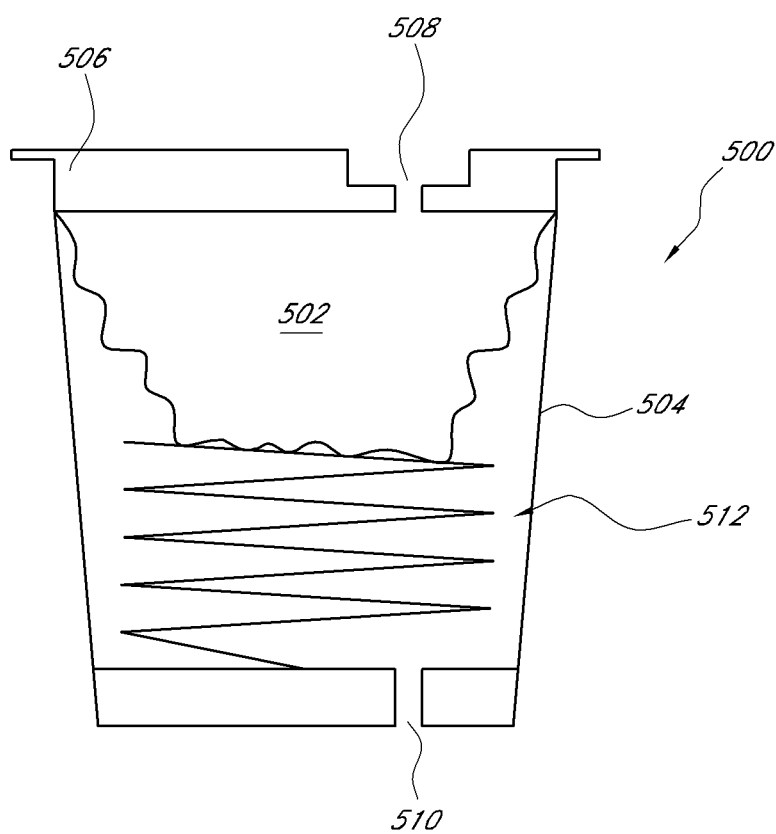
FIG. 5 is a schematic illustration of a pod adaptor assembly of yet another preferred embodiment of the present invention.

FIG. 5 is a schematic illustration of yet another embodiment of the pod adaptor assembly 500 of the present invention showing a cross-section of the assembly when used with a beverage pod 502. The pod adaptor assembly 500 comprises a receptacle 504 and a cover 506 adapted to sealingly engage with the receptacle 504. The assembly 500 further includes a biasing mechanism 512 adapted to elevate and press the pod 502 against the cover 506 when the cover is sealingly engaged with the receptacle 504. In one implementation, the pressure applied against the pod advantageously compacts the ground coffee in the pod which has a similar effect as tamping the coffee. In certain preferred embodiments, the assembly has an inlet 508 for introducing pressurized hot water into the receptacle and an outlet 510 for allowing outflow of brewed beverage. In one implementation as shown in FIG. 5, the inlet 508 is an opening formed in the cover 506 that is also adapted to receive a liquid inlet probe, which is part of a single serve beverage brewers designed for cup-shaped cartridges. Also in the implementation shown in FIG. 5, the outlet 510 comprises an opening formed in the base of the receptacle to allow for outflow of brewed beverage from the receptacle as well as unobstructed upward extension of a puncture needle that is part of certain single serve beverage brewers designed for cup-shaped cartridges. By pressing the pod up against the cover, the pod is also pressed up against the inlet 508 through which hot water flows into the chamber. This advantageously "traps" the hot water in the pod for a longer period of time and produces a stronger and more consistent brewed beverage. In addition to being an adaptor assembly for cup-shaped brewers, the receptacle having a biasing device as shown in FIG. 5 can also serve as a brewing chamber for pod brewers.

In one embodiment, the biasing mechanism 512 is a spring positioned inside the receptacle and extending upwardly from the base. The flexibility of spring is advantageous because it provides an adjustable support surface that can accommodate and apply pressure against pods of a variety of different sizes. In cases of thicker or larger pods, the spring can be simply compressed more to accommodate the pods. The spring can push the pods of different thicknesses and sizes up against the hot water being introduced into the receptacle. It will also be appreciated that a variety of different biasing mechanisms can also be used to press the pod against the inlet hot water. For example, the biasing mechanism can be a spring attached to the interior of the cover. As described above, pushing the pod against the hot water inlet compacts the ground coffee and also causes much less water to escape from the pod during the brewing pod. As a result, a much stronger and consistent cup of coffee is produced.

Figure 6:
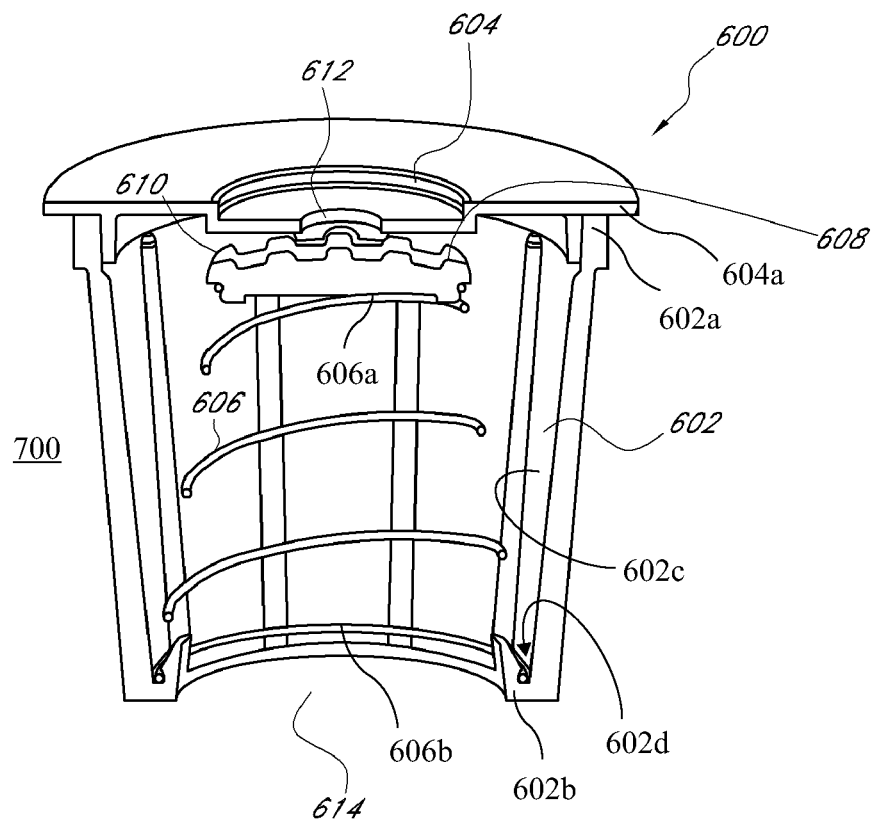
FIG. 6 is a schematic illustration of a cross-sectional view of a pod brewing chamber of one preferred embodiment of the present invention.

FIG. 6 is a cross-sectional view of a pod brewing chamber 600 of one preferred embodiment of the present invention incorporating the novel biasing mechanism. The pod brewing chamber 600 can be used in conjunction with a variety of different conventional pod brewers such as those described in U.S. Pat. Nos. 6,904,840, 7,047,870 and 7,131,369, which are hereby incorporated by reference. The pod brewing chamber 600 comprises a cup-shaped housing 602 and a cover 604. Preferably, the housing 602 has a frustoconical shaped interior surface 602c and is sized to receive a circular beverage pod. In a preferred embodiment, the housing 602 has a height of about 44.5 mm, a lower diameter of about 35 mm and an upper diameter of about 45.5 mm. As also shown in FIG. 6, the brewing chamber 600 further includes a spring 606 extending upwardly from the base 602b of the housing and having an upper end 606a and base 606b, the base 606b residing in a notch 602d in the base of the housing 602 and a platform 608 having a top surface 610 with rounded features attached to the upper end 606a of the spring 606. In one implementation, the platform 608 comprises a circular support having ribs arranged in a spaced part configuration across the upper surface of the platform 608. In operation, a coffee pod is inserted into the housing by being placed on the platform 608 and pressed downwardly until the pod is inside the housing and the cover 604 can be placed over the opening of the housing. As also shown in FIG. 6, the cover 604 has an opening 612 through which hot water can be injected into the housing, and a rim 604a radially overlapping a top edge 602a of the housing 602. The rim 604a provides a graspable portion residing outside the interior of the housing 602 for removal of the cover 604. The brewing chamber further includes a lower opening 614 in the base 602b of the housing 602 for brewed coffee to flow out of the chamber and a chamber exterior region 700 outside the brewing chamber.

The unique concept of providing a biasing mechanism to press a coffee pod against the hot water inlet in a pod brewer can be applied to a variety of different coffee brewing systems. Preferably, when the spring is fully compressed, the force applied to a pod is preferably 1.5 lb. The pressure range being exerted against the pod can preferably range between 0 to 1.5 lbs. Thus, for example a large pod will have more pressure exerted on it than a smaller pod, because the spring is being compressed more. Moreover, the cross-section of the platform is preferably smaller than the diameter of the bottom so it can travel up and down the cup-shaped housing. In certain embodiments, the platform serves two functions by preventing the needle in certain single beverage brewers from perforating the pod from the bottom and also pushing the pod evenly against the hot water inlet so when brewing the coffee produced is consistent.

As describe above, the pressure applied against the pod by the biasing mechanism compacts the coffee and serves the function of tamping the coffee. Thus, less ground coffee would be required to be packaged in a pod to brew a cup of coffee. It will be appreciated that the biasing mechanism can also be incorporated in any of the pod adaptor assemblies described herein. The pod adaptor assembly of the preferred embodiments can be made of a variety of different materials, including metal and plastics.

Although the foregoing description of the preferred embodiments of the present invention has shown, described and pointed out the fundamental novel features of the invention, it will be understood that various omissions, substitutions, and changes in the form of the detail of the invention as illustrated as well as the uses thereof, may be made by those skilled in the art, without departing from the spirit of the invention. Particularly, it will be appreciated that the preferred embodiments of the invention may manifest itself in other shapes and configurations as appropriate for the end use of the article made thereby.

What is claimed is:

1. A beverage brewer, comprising:
a brewing chamber;
a container, disposed within the brewing chamber and adapted to hold brewing material while brewed by a beverage brewer, the container comprising:
a receptacle configured to receive and support the brewing material; and
a cover;
wherein the receptacle includes
a base, having an interior surface, an exterior surface, and a passageway in an interior area of the base, providing fluid flow through the interior surface and the exterior surface, and
at least one sidewall extending upwardly from the interior surface of the base,
wherein the cover is adapted to sealingly engage with a top edge of the at least one sidewall, the cover including an opening, and
wherein the container is adapted to accept input fluid through the opening and to provide a corresponding outflow of fluid through the passageway;
an inlet port, adapted to provide the input fluid to the container; and
a needle-like structure, adapted to receive outflow fluid from the container through the base passageway;
wherein the passageway is disposed to receive the needle-like structure and to provide a clearance around the needle-like structure such that the needle-like structure does not puncture the base.

2. The beverage brewer of claim 1, wherein the receptacle also includes at least one extension that raises the base a predetermined distance above a lower surface of the brewing chamber, wherein the predetermined distance is selected such that a tip of the needle-like structure does not penetrate the exterior surface of the base.

3. The beverage brewer of claim 1, wherein the container is reusable.

4. The beverage brewer of claim 1, wherein the passageway has an unobstructed configuration.

5. A beverage brewer, comprising:
a brewing chamber;
a container, disposed within the brewing chamber and adapted to hold brewing material while brewed by a beverage brewer, the container comprising:
a receptacle configured to receive the brewing material; and
a cover;

wherein the receptacle includes
    a base, having an interior surface and an exterior surface, wherein at least a portion of the base is disposed a predetermined distance above a bottom surface of the brewing chamber, and
    at least one sidewall extending upwardly from the interior surface of the base,
    wherein the receptacle has at least one passageway that provides fluid flow from an interior of the receptacle to an exterior of the receptacle;
    wherein the cover is adapted to sealingly engage with a top edge of the at least one sidewall, the cover including an opening, and
    wherein the container is adapted to accept input fluid through the opening and to provide a corresponding outflow of fluid through the passageway;
an inlet port, adapted to provide the input fluid to the container; and
a needle-like structure, disposed below the base;
wherein the predetermined distance is selected such that a tip of the needle-like structure does not penetrate the exterior surface of the base.

6. The beverage brewer of claim 5, wherein at least one passageway of the at least one passageway is disposed in the base.

7. The beverage brewer of claim 5, wherein the receptacle also includes at least one extension that raises the at least a portion of the base the predetermined distance above the bottom surface of the brewing chamber.

8. The beverage brewer of claim 5, wherein the container is reusable.

9. The beverage brewer of claim 5, wherein at least one passageway of the at least one passageway is unobstructed.

10. A beverage brewer, comprising:
a brewing chamber;
a container, disposed within the brewing chamber and adapted to hold brewing material while brewed by a beverage brewer, the container comprising:
    a receptacle configured to receive the brewing material; and
    a cover;
    wherein the receptacle includes
        a base, having an interior surface, an exterior surface, and a passageway in an interior area of the base, providing fluid flow through the interior surface and the exterior surface, and
        at least one sidewall extending upwardly from the interior surface of the base,
    wherein the receptacle is adapted to support the brewing material a predetermined distance above a lower surface of the brewing chamber,
    wherein the cover is adapted to sealingly engage with a top edge of the at least one sidewall, the cover including an opening, and
    wherein the container is adapted to accept input fluid through the opening and to provide a corresponding outflow of fluid through the passageway;
an inlet port, adapted to provide the input fluid to the container; and
a needle-like structure, disposed below the brewing material;
wherein the predetermined distance is selected such that the needle-like structure does not touch the brewing material when held by the container.

11. The beverage brewer of claim 10, wherein the receptacle also includes at least one extension that raises the base the predetermined distance above the lower surface of the brewing chamber.

12. The beverage brewer of claim 10, wherein the container is reusable.

13. The beverage brewer of claim 10, wherein the passageway has an unobstructed configuration.

14. A beverage brewer, comprising:
a brewing chamber;
a container, disposed within the brewing chamber and adapted to hold brewing material while brewed by a beverage brewer, the container comprising:
    a receptacle configured to receive the brewing material; and
    a cover;
    wherein the receptacle includes
        a base, having an interior surface, an exterior surface, and a passageway in an interior area of the base, providing fluid flow through the interior surface and the exterior surface, and
        at least one sidewall extending upwardly from the interior surface of the base,
    wherein the cover is adapted to sealingly engage with a top edge of the at least one sidewall, the cover including an opening, and
    wherein the container is adapted to accept input fluid through the opening and to provide a corresponding outflow of fluid through the passageway;
an inlet port, adapted to provide the input fluid to the container; and
a needle-like structure, adapted to receive outflow fluid from: the container through the base passageway; and
wherein the passageway allows the outflow fluid to flow from the container.

15. The beverage brewer of claim 14, wherein the receptacle also includes at least one extension that raises at least a portion of the base a predetermined distance above a lower surface of the brewing chamber, wherein the predetermined distance is selected such that a tip of the needle-like structure does not penetrate the exterior surface of the base.

16. The beverage brewer of claim 14, wherein the container is reusable.

17. The beverage brewer of claim 14, wherein the passageway has an unobstructed configuration.

18. A beverage brewer including a brewing chamber configured to receive a brewing cartridge, an inlet port adapted to provide an input fluid, and a needle-like structure fixed in a bottom of the brewing chamber and adapted to puncture a shell of the brewing cartridge to carry an outflow of brewed beverage from the brewing cartridge and arranged to avoid puncturing filtering material containing brewing material disposed inside the shell, the improvement comprising:
a container configured to replace the brewing cartridge, the container positionable within the brewing chamber and adapted to hold brewing material while brewed by the beverage brewer, the container including:
    a receptacle configured to receive and support the brewing material, and
    a cover;
    wherein the receptacle includes:
        a passageway providing fluid communication between an interior of the receptacle and the brewing chamber,
        a base, having an interior surface and an exterior surface and configured to avoid contact with the needle-like structure, and at least one sidewall extending upwardly from the interior surface of the base and configured to avoid contact with the needle-like structure;

wherein the cover is adapted to sealingly engage with a top edge of the at least one sidewall, the cover including an opening, and wherein the container is adapted to accept the input fluid from the inlet port through the opening and to provide a corresponding outflow of fluid through the passageway.

19. The beverage brewer of claim 18, wherein the container is reusable.

20. The beverage brewer of claim 18, wherein the receptacle also includes at least one extension that raises the base a predetermined distance above a lower surface of the brewing chamber.

21. The beverage brewer of claim 18, wherein the passageway has an unobstructed configuration.

\* \* \* \* \*